Dec. 29, 1959 W. R. JOHNSTON 2,919,194
ACTIVE DRY YEAST PRODUCTS AND PROCESSES
FOR PRODUCING THE SAME
Filed Dec. 24, 1957 2 Sheets-Sheet 1

Dec. 29, 1959  W. R. JOHNSTON  2,919,194
ACTIVE DRY YEAST PRODUCTS AND PROCESSES
FOR PRODUCING THE SAME
Filed Dec. 24, 1957  2 Sheets-Sheet 2

United States Patent Office 2,919,194
Patented Dec. 29, 1959

2,919,194

ACTIVE DRY YEAST PRODUCTS AND PROCESSES FOR PRODUCING THE SAME

William R. Johnston, Chappaqua, N.Y., assignor to Standard Brands Incorporated, New York, N.Y., a corporation of Delaware Application December 24, 1957, Serial No. 704,942

28 Claims. (Cl. 99—96)

This application is a continuation-in-part of my copending application, Serial No. 362,410, filed June 17, 1953, which application is in turn a continuation-in-part of my earlier application, Serial No. 142,710, filed February 6, 1950, now abandoned.

The present invention relates to a novel process for preparing active dry yeast, and active dry baker's yeast in particular, and to the novel dry baker's yeast thereby produced.

Active dry baker's yeast is a composition of matter comprising viable yeast cells which have been dehydrated to a low moisture content, such as below about 10% by weight. The cells, when rehydrated, possess the capacity to leaven bread and other baked products. It has long been the goal of the yeast manufacturer to obtain a dry active yeast in which all or nearly all of the yeast cells are viable and capable of leavening bread and other baked products. For such a product to be of practical value the proportion of dead or weakened cells must be maintained at a minimum. The presence of a substantial proportion of dead or weakened cells results in reduction of the leavening activity of the yeast and also has an undesirable effect upon the quality of goods baked with it as evidenced by the lower volume and poorer texture of the finished baked goods.

Millions of pounds of baker's yeast having high leavening power are sold annually for commercial baking operations. Heretofore, it has been considered necessary by nearly all commercial bakers to employ freshly prepared yeast in a compressed form. This compressed yeast is produced by steps well known in the art involving centrifuging, filtering and compressing freshly propagated yeast of a highly active, but metabolically sensitive, strain to remove from it some of the entrained water and provide a product in the form of cakes or blocks.

Commercial baker's yeast is made from selected cultures of the yeast species *Saccharomyces cerevisiae* Hansen. The criteria for selecting cultures are well known in the art and include, for example, consideration of leavening power, yield during manufacture, and stability during storage. The cultures employed for baking uses are of two distinct types when classified according to bios response by the procedure published in Schultz and Atkin in "Archives of Biochemistry," vol. 14, p. 369 (August 1947). The first type, which is designated as Bios No. 23 (and also known as the Gebrüder Mayer strain), has lesser leavening activity than the second type, but is hardier and metabolically more stable than the second and affords larger yields in yeast manufacture. It is widely used outside the United States for the manufacture of fresh compressed baker's yeast, and it is also commonly used in the United States for making dried yeast by the methods heretofore employed. The second type is classified as Bios No. 236. It is less hardy, less metabolically stable, and the yields in yeast manufacture are somewhat lower. But it is preferred by commercial bakers in the United States because of its superior leavening activity, and is commonly used in the United States for making fresh compressed baker's yeast. In the United States, the Bios No. 236 strain is also used to a limited extent, after being specially conditioned as hereinafter explained, for making dried yeast by known methods. In the American Type Culture Collection, culture No. 7752 is an example of the Bios No. 23 type and culture No. 2335 is an example of the Bios No. 236 type. Some special cultures of the Bios Nos. 23 and 236 strains currently in commercial use differ somewhat from the particular examples deposited in said Culture Collection but not in respects pertinent to the present invention.

Commercial filtering and compressing equipment is capable of removing only a relatively small amount of water from centrifuged yeast and the compressed product will contain at most about 40% by weight of solids and therefore at least about 60% water. Aside from the fact that the distribution of a product containing so much water is costly, this product possesses other serious disadvantages. Such compressed yeast does not retain satisfactory leavening activity when stored for more than brief periods of time. For example, at normal room or ambient temperatures, compressed fresh baker's yeast of the Bios No. 236 strain has a useful shelf life of only about 5 to 7 days and under normal refrigeration conditions (40° F.) this period can be extended to only a month or two. After such periods the yeast tends to spoil and suffers thereby serious loss of viability, as demonstrated by substantially reduced leavening action. In the case of storage at 77° F., after 3 days' time about 25% more time is required to leaven high sugar (sweet goods) doughs and about 5% more time to leaven sponge (bread) doughs than was required initially with fresh yeast. At the end of one week's storgae at 77° F. more than about 100% additional time is required to leaven both types of doughs. In the case of the same yeast stored at refrigeration temperatures (40°F) for two months, leavening of bread doughs and sweet goods doughs required about 33% and 105% more time, respectively, than initially.

Because of the short storage life of compressed fresh baker's yeast, it is necessary for yeast producers to deliver fresh compressed yeast to the baker at frequent intervals. It is impractical to stock-pile significant quantities of the compressed baker's yeast and the production schedule of the yeast producer must be closely synchronized with the daily requirements of the bakers.

As those skilled in the art are well aware, extensive efforts over many years have been directed toward providing a means of producing a stable, highly active, dry yeast. Prior to the present invention these efforts have been relatively unsuccessful, so must so that most commercial bakers still rely upon compressed fresh yeast as the only satisfactory source of yeast suitable for their baking operations.

Living microorganisms, and particularly yeast strains suitable for leavening, are extremely delicate and sensitive to changes in environment. Since undried yeast cells normally contain about 60% by weight of water, any treatment which substantially reduces this water content affects the life processes of the cells and may result in the weakening or death of many of the cells. Drying of the yeast cells without killing them requires that the intracellular water pass through the cell membrane in such a manner that the vitality of the yeast will not be seriously impaired. Thus, it is not surprising that drying processes which have been found to be satisfactory for dehydrating non-living materials have been found to be unsuitable for producing highly viable and stable dry yeast since they partially or completely destroy the vitality of the yeast.

Among the conventional drying processes which have been used for drying yeast is drum drying. In this process a thin layer of aqueous yeast suspension is dried on a rotating drum and heated indirectly by steam or other source of heat while under atmospheric or subatmospheric pressure. While the process accomplishes the efficient dehydration of the yeast, the vitality of the yeast is substantially completely destroyed.

Another conventional drying process which has been applied to drying yeast is spray-drying. In that process an aqueous suspension of yeast is sprayed into a stream of hot air. As in the case of drum drying, the dehydration of the yeast is accomplished efficiently, but the resulting dry product is substantially without vitality.

Another drying process whch has often been found to be particularly effective for drying heat sensitive materials, including certain microorganisms, blood and blood plasma, and certain medicinal chemicals, such as penicillin, is freeze-drying, generally referred to as lyophilization. This process consists of freezing an aqueous solution or suspension to be dried and then subliming the moisture from the frozen mass under vacuum without permitting the mass to undergo melting. When employed in drying yeasts, freeze-drying was found to destroy the viability of more than 80% of most types of yeast cells (as noted in the article by Kirsop in "Journal of the Institute of Brewing," vol. 61, page 466, 1955). This low survival rate coupled with the high cost of the process makes freeze-drying unsuitable for producing dry yeast.

Of all of the processes heretofore tried for drying baker's yeast, the best known and most successful commercially to date is the so-called "spaghetti process." This process is employed commercially to produce a dry baker's yeast product which is sold primarily to the consumer for home baking. For reasons which will be discussed below, this product has not been generally acceptable to commercial bakers, who still use the more active undried fresh baker's yeast.

The "spaghetti process" involves extruding compressed fresh baker's yeast in spaghetti form and drying this on a moving belt. The yeast must be conditioned for drying by growing it under particular nutrient conditions and is usually of the more stable but less active Bios No. 23 strain. The compressed yeast, which contains about 30% to 40% by weight of yeast solids, is extruded into strips resembling spaghetti several inches in length and approximately ⅛ inch in diameter. The resulting strips are then exposed to a stream of relatively dry air having a temperature of approximately 100° F. The rate of dehydration may be regulated by varying the temperature and humidity of the drying air and its rate of flow. After drying the extruded strips for about 6 to 8 hours, a dry product containing from about 7.5 to 10% moisture is obtained. Even when the more stable but less active Bios No. 23 strain is used, the resulting dry product generally requires at least about 20% more time to leaven doughs than does the original fresh yeast when compared on a yeast solids basis. If drying is carried out at the same rate to reduce the moisture content to a value much below 7.5%, the activity and viability of the yeast is even more seriously impaired. The dry yeast is finally comminuted to the desired particle size.

In order to produce a reasonably viable dry yeast by means of the spaghetti process which meets even minimal requirements for baking purposes, it is necessary to observe other painstaking precautions. It is necessary to employ yeast as a starting material which has been propagated under nutrient conditions which restrict the nitrogen and phosphorus intake of the yeast and thereby produce a yeast which is of relatively reduced protein and phosphorus contents. Whereas the compressed, fresh baker's yeasts employed for commercial baking purposes ordinarily have an apparent protein content in the range of about 47 to 52% on the basis of yeast solids content (as estimated by multiplying the nitrogen content by 6.25) and a phosphorus content in the range of about 2.6 to 4% calculated as $P_2O_5$; the nitrogen and phosphorus restricted yeasts employed for drying in the spaghetti process have a protein content in the range of only about 38 to 44% on a yeast solids basis and a phosphorus content in the range of only about 1.6 to 2.4% when calculated as $P_2O_5$. This nutritional adjustment reduces the leavening activity of the yeast so that it requires about 10% more time to give the same leavening effect as the fully nutured yeast but is necessary to impart to the yeast sufficient resistance to withstand drying when dried under the conditions of the spaghetti process.

The dry yeast manufactured by the spaghetti process from the highly active Bios No. 236 yeast strain employed in commercial baking, which has been subjected to the above-described nutritional adjustment, does not have sufficient storage stability to make it suitable for consumer sales through grocery stores for home baking purposes, where a shelf life of at least about 6 months is required. For this purpose it is necessary to employ the hardier Bios No. 23 strain of yeast. When this strain of yeast is dried by the spaghetti process it possesses satisfactory storage stability, but its baking activity is inferior and generally unacceptable to the commercial baking industry.

Active dry baker's yeast produced by the spaghetti process, the best commercial process currently available, and all other prior art dry baker's yeasts also suffer from other serious disadvantages which have greatly limited their acceptance by commercial bakers. One disadvantage is that it is necessary to rehydrate the yeast carefully before incorporating it into a dough. In rehydrating the dry yeast, the temperature of the water used should be in the neighborhood of 110° F. If water substantially colder or warmer is employed, the activity of the yeast will be reduced. During the rehydration the yeast should be allowed to soak for about 5 to 10 minutes without stirring. Yeast absorbs water slowly and if the yeast suspension is stirred before the cells absorb sufficient water, lumps will form which are difficult to disperse. Such lumps cause unsatisfactory leavening action.

Another serious disadvantage of prior art dry baker's yeasts is that the quality of baked goods produced with them is inferior to that of baked goods produced from fresh compressed baker's yeast. This inferiority is believed to be a result of the so-called "proteolytic effect" exerted by such prior art dry baker's yeasts but not by fresh compressed baker's yeast. This "proteolytic effect" is evidenced by a coarse crumb and reduced volume in bread, such bread being scored lower by those skilled in the baking art. Furthermore, the use of large quantities of the prior art dried baker's yeasts in doughs to compensate for their reduced leavening activity results in intensifying this undesirable "proteolytic effect."

Probably the most serious disadvantage of the prior art dry baker's yeast products is their reduced leavening activity on a yeast solids basis when compared to fresh compressed baker's yeast. For example, when employing the best dry baker's yeast heretofore known, that produced by the spaghetti process, it is commercial practice to use at least about 23% more yeast solids than in the case of fresh compressed baker's yeast. Even then, the rate of dough-rise is less than with fresh compressed baker's yeast. To obtain equivalent dough-rise rates, it is usually necessary that the level of yeast solids in the form of the best prior art dry baker's yeast be at least 50% greater than the level of yeast solids in the form of fresh compressed baker's yeast, Bios No. 236 strain.

Among the many and diverse attempts of the prior art to preserve the vitality of yeast during drying has been the treatment of the yeast with various saccharide materials before or during drying. One of the theoretical considerations which prompted these attempts was the biochemists' idea that fermentation of the saccharide would supply energy to the yeast cells to enable them to continue their metabolic action during the drying and thereby enhance their ability to survive. Most of these prior art attempts constituted nothing more than a conditioning treatment prior to drying whereby the yeast was permitted to metabolize in a nutrient medium rich in a yeast-fermentable saccharide but containing no other nutrients or limited amounts thereof. The best of such conditioning methods are used in the process hereinabove described, which is employed to reduce the nitrogen and phosphorus contents of the yeast prior to drying it by the sphaghetti process. In addition to reducing the nitrogen and phosphorus contents, the content of reserve carbohydrates, such as trehalose, of the cells is substantially increased. In other prior art drying methods the presence of a yeast fermentable sugar during the drying operation has been recommended. However, such use of sugar during drying in accordance with these prior art drying methods affords substantially no benefits when applied to the yeast strains used in modern baking and, so far as I am presently aware, has never been employed in any commercial yeast drying process.

It is, accordingly, an object of the present invention to overcome the shortcomings of the prior art processes for drying yeast.

It is also an object of the present invention to provide a novel process for preparing active dry yeast, and, in particular, active dry baker's yeast.

It is an additional object of the invention to provide a process for preparing active dry baker's yeast which is substantially equal in baking activity and quality to the fresh baker's yeast from which it was produced, when compared on the basis of yeast solids content.

It is a further object of the invention to provide a novel active dry baker's yeast which is storable for long periods of time with only minimal loss in baking activity and may be employed in baking operations without requiring any separate rehydration treatment.

The above enumerated objects, as well as other objects, together with the advantages of the invention, will readily be comprehended by persons skilled in the art upon reference to the following description, taken in conjunction with the annexed drawings comprising photographs and photomicrographs of active dry baker's yeast produced by the spaghetti process and in accordance with the process of the present invention.

Figure 1:
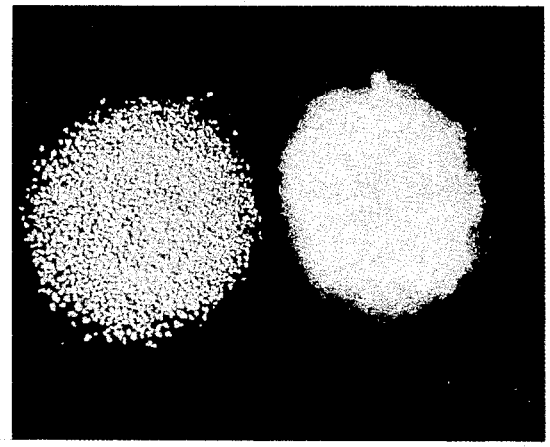
Fig. 1 is an unmagnified photograph comparing the appearances of the conventional commercial active dry yeast (left-hand field) produced by the sphaghetti process with active dry baker's yeast (right-hand field) produced in accordance with the present invention, specifically, a product of the type produced according to Example 9 hereinbelow.

In accordance with the process of the present invention, wet yeast containing various amounts of moisture is suspended in a finely-divided state in a liquid edible oil or equivalent non-deleterious liquid and the moisture evaporated from the yeast while suspended in said liquid. Evaporation of the moisture is desirably facilitated by bringing the suspension of the yeast in the liquid into intimate contact with air or other non-deleterious gas, for instance, by bubbling the gas through the suspension or by spraying the suspension into the gas.

The liquid medium in which the yeast is suspended may be any liquid which has no deleterious effect upon the yeast and from which water can be removed by the methods hereinafter described. Advantageously the suspending liquid is water-immiscible and is not as volatile as water. Most suitable are the edible oils of vegetable, animal or mineral origin. Best results to date have been obtained with corn oil. Other glyceridic vegetable oils which provide satisfactory results are soybean, cottonseed, rice and peanut oils. Animal oils, preferably of marine origin, such as sperm whale oil, may be employed. Mineral oils, either light or heavy, which are of a hydrocarbon nature, are also suitable. The addition of a non-deleterious wetting agent to the liquid suspending medium, if the liquid is too hydrophobic, is sometimes desirable to facilitate drying. It is usually desirable to incorporate a small amount of a wetting agent into mineral oils. Among the wetting agents which have provided satisfactory results are sorbitan monooleate, which is sold under the trademark "Span 80," sorbitan monolaurate ("Span 20"), sorbitan monostearate ("Span 60"), phosphorylated lecithin ("Alcolec HO"), lecithin ("Alcolec"), and diacetyltartaric acid ester of 95% lard monoglyceride ("TEM"). Other equivalent wetting agents suitable for the purpose will be apparent to those skilled in the art.

Among equivalent suspending fluids which can be used are, for example, silicone liquids, such as Silicone 550 (a liquid-water-immiscible siloxane polymer containing methyl and phenyl groups), and certain liquid esters, such as dibutyl phthalate, tributyl citrate, and triethyl citrate. An important advantage of the edible oils is that they may be left in the final dry yeast. Other equivalent suspending liquids will be apparent to those skilled in the art.

The edible glyceridic oils have been found to be very satisfactory for use as the suspending liquid in spite of the fact that many of them normally have a tendency in the presence of oxygen to become rancid. Under the conditions of the drying process of the invention, rancidification is retarded. For example, in the case of corn oil, one batch of oil has been reused more than 200 times, replacing only the small amounts removed with the dry yeast, without any evidence of rancidity development. In this connection, the corn oil used in the examples hereinafter given was not hydrogenated. Of course, it is possible to use hydrogenated oils, if they are liquid at the temperature of drying; but it is not necessary to do so. In using unsaturated oil, reasonable care should be taken to keep the oil out of contact with metals known to promote rancidification.

In my process and in all of the specific examples, the proportions of yeast solids to oil in the slurry suspension to be treated may be varied over a wide range. The proportion of oil should be sufficient to maintain the suspension in a fluid state throughout the drying operation. The specific examples hereinafter given illustrate proportions that I have found suitable and convenient but I have also found that, subject to the requirements of fluidity, smaller proportions and larger proportions of oil work about equally well. Of course, excessively large proportions of oil are less economical.

Some liquids, such as acetone and hydroxylic liquids, such as ethanol, glycerol, propylene glycol, and 2,4-pentanediol, have been found to be unsuitable as suspending liquids since they injure the viability of the yeast cells. Possibly they penetrate the cell walls of the wet yeast and interfere with the life processes or absorb water so rapidly as to injure the cells.

The drying of the yeast while suspended in the oil or equivalent non-deleterious liquid is desirably accomplished by bringing the yeast suspension into intimate contact with any gas which is not deleterious to the yeast or the suspending liquid. Suitable gases include oxygen, air, nitrogen and carbon dioxide. Best results are obtained with a gas which contains some free oxygen. Substantially pure oxygen and ordinary untreated air are equally suitable and both provide final dry yeast products which are superior to those produced using nitrogen or carbon dioxide, both when the dry yeast is freshly prepared and after it has been stored. Air is preferred because of the economy it permits. The gas may be dehumidified before bringing into contact with the yeast suspension, thereby providing a greater capacity for removing moisture from the suspension. However, because of the relatively large volumes of gas employed and the expense of dehumidifying it, it is usually more economical to use ambient air without subjecting it to dehumidification.

The rate of drying of the yeast by the process of the invention is controlled by such factors as (1) the humidity of the drying gas, (2) the rate at which the drying gas is brought into contact with the yeast suspension, and (3) the temperature at which the suspension is maintained. It is advantageous to employ the highest temperature which does not damage the yeast and thereby reduce the amount of gas necessary to produce a satisfactory rate of drying.

The heat employed during the drying of the suspended yeast may be supplied in any desired manner, such as by heating the gas used to dry the yeast or by circulating a hot fluid through a jacket surrounding the vessel used for the drying, or by circulating the suspension through an external heat exchanger.

The rate at which the water is removed from the yeast suspended in the oil or other liquid is a factor which may affect the quality of the dry yeast product obtained, especially when a fermentable sugar is present during the drying. Suitable rates are hereinafter illustrated and described in connection with the examples.

In the process of the invention, it is satisfactory to employ initial drying temperatures of between about 95 and 104° F. until the moisture content of the yeast product is reduced to about 30%. As the drying continues, the temperature may be increased gradually. For instance, temperatures up to about 120° F. when the yeast product contains about 10% moisture, up to about 140° F. when the moisture content is about 5%, and up to about 155° F. when the moisture content reaches about 2%.

Such a drying temperature schedule is in sharp contrast with that found satisfactory in the spaghetti process, described hereinabove. In that process the final phase of drying is the most critical. Temperatures below about 120° F. are usually used and the drying is stopped at about 8% moisture. To reduce the moisture further without serious damage to the yeast, the rate of drying must be so slow as to make the process economically unattractive. In contrast to this, the process of the present invention permits one to complete the drying of the yeast in a short period, for instance, as little as three hours, in which time the moisture content may be reduced to minimal values, such as about 5% and even to as little as 1% or 2%, without substantial reduction in the leavening properties of the yeast.

The yeast employed as the starting material in the drying process of the present invention may contain various amounts of water. While it may be employed in the compressed form, containing for instance about 60 to 70% water, it is preferable to use it as a water slurry, such as commercial cream yeast, because in this form it can be dispersed more readily in the suspending liquid. The use of commercial cream yeast offers the added advantage that the filter pressing and extruding operations required for production of compressed yeast may be omitted.

The drying of the suspended yeast is desirably continued until its moisture content has been reduced to a level of about 10% or less in order to attain significant storage stability at room temperature. Greater storage stability may be attained by reducing the moisture content further, such as to 5% or even to as low as about 1% or 2%.

Upon completion of the drying, the yeast may be separated from the bulk of the oil or other liquid in which it is suspended in any desired manner, for example, by settling, filtration or centrifuging. In the case of vegetable oils, centrifuging of the yeast suspension can provide a product with a residual oil content of about 10% or 5% or even less. Residual edible oils may be permitted to remain in the product and may be useful, for instance, when the dry yeast is employed in certain baking formulae. If desired the level of residual liquid may be reduced by extraction with a suitable solvent to below 1%. When corn oil is employed, solvents such as methylene chloride, hexane, ethanol and acetone may be used to extract the residual oil from the dry yeast without harmful effects. Although ethanol and acetone destroy the viability of wet yeast and cannot be used as suspending liquids during drying, they do not appear to be harmful to yeast in the dry state when in contact with it for a short period and can therefore be used as extracting solvents. Of course, as those skilled in the art will recognize, other solvents may be employed to extract the residual amounts of suspending liquid from the dry yeast and the solvent most suitable will vary with the nature of the suspending liquid.

It will be apparent to those skilled in yeast technology that the basic yeast drying process described hereinabove, i.e., involving removal of moisture from yeast while it is dispersed in a suspending liquid, constitutes a unique approach to the drying of yeast and has obvious advantages over the prior art yeast drying processes.

I have further discovered that if the yeast in this basic process is permitted to ferment a carbohydrate during the drying, it is possible to obtain a dry product which is equal in leavening activity to the undried starting material and has the additional advantage that it is stable over long periods at room temperature. This is true of baker's yeast strains generally whether they have been conditioned for drying or not. Of particular importance is the fact that this novel process permits the drying of the highly active well-nurtured baker's yeast of strain Bios No. 236, to produce a dry product which is substantially equal in leavening activity, on a yeast solids basis, to the most active compressed baker's yeast available commercially today and has the advantage of maintaining its activity for long periods at room temperature and for more than a year at refrigeration temperatures (40° F.).

Metabolizing the fermentable carbohydrate under the conditions of my process appears to protect the delicate yeast cells from the rigors of dehydration. As a result of an extensive investigation it has been discovered that protection of the yeast during the drying process is provided by any saccharide which is fermentable by the yeast. Such sugars include sucrose, glucose, fructose, maltose, raffinose and mannose, and mixtures thereof. Other sugars like galactose may be used if the yeast has been previously adapted to metabolize them by well known procedures. While all of the fermentable sugars provide dry baker's yeast products which are excellent when freshly prepared, the dry products obtained with sucrose, glucose, fructose or mannose are not as stable as those obtained with maltose or raffinose.

Maltose and raffinose provide dry baker's yeast products which are not only equally as active when first prepared as the wet yeast from which they are made, but are also stable over long periods of time. The reason for this difference in storage stability is not known.

In addition to the substantially pure fermentable sugars discussed above, a number of commercial carbohydrate products containing mixtures of fermentable and non-fermentable carbohydrates may be employed in the process of the invention. Thus, malt syrups and the sugar-containing hydrolytic products of starches, such as corn, wheat, tapioca, sorghum and waxy maize starches, are capable of providing dry baker's yeast products which are of the highest activity when fresh and maintain a high level of activity during long periods of storage. These syrups contain substantial amounts of both maltose and glucose. Commercial corn syrups are produced in various grades having various sugar contents, depending upon the degree of hydrolysis of the corn starch. These commercial syrups are well standardized and are graded according to their D.E. (dextrose equivalent) number. The dextrose equivalent expresses the percent of reducing sugars on a dry weight basis in the product, calculated as dextrose. The higher the D.E. value, the greater the degree of hydrolysis of the starch as indicated by the greater percent concentration of reducing sugars, principally dextrose and maltose, and the lower content of dextrins. Typical analyses of the solids composition of acid hydrolyzed corn syrups of various D.E. values, as published in the "Northwestern Miller," of October 5, 1954, in an article by J. W. Evans, entitled "The Technology of Sugars, Syrups and Starches Manufactured from Corn," are given below:

| Acid Hydrolyzed Syrups, D.E. | Percent Composition, Solids Basis | | | |
|---|---|---|---|---|
| | Dextrose | Maltose | Higher Sugars (non-fermentable) | Dextrins |
| 24 | 8 | 8 | 21 | 63 |
| 35 | 16 | 16 | 21 | 47 |
| 42 | 22 | 21 | 20 | 37 |
| 50 | 30 | 26 | 14 | 30 |
| 66 | 41 | 35 | 14 | 10 |

It has been discovered that hydrolyzed starch syrups having certain D.E. values may be used to produce dry baker's yeast products having both high initial leavening activity and good stability over long periods of storage at room temperature. Acid hydrolyzed corn syrups having a D.E. value of about 52 have been found to be very satisfactory for providing high activity in combination with stability. For best results, the amount and composition of the syrup used should be such that at the end of the drying process all or nearly all of the dextrose and other fermentable sugars present, except maltose (and raffinose if present), are fermented. My best results were obtained when some of the maltose remained unfermented. Preferably the dry yeast product shall contain at least about 25% by weight of a residue of the fermented carbohydrate syrup consisting principally of maltose, higher sugars and dextrins. For both high initial yeast activity and satisfactory storage stability, it is desirable to employ an acid hydrolyzed syrup having a D.E. value of between about 42 and 65, and preferably between about 50 and 60. With combined acid-enzyme hydrolyzed corn syrups, D.E. values slightly higher than for solely acid-hydrolyzed syrups gave comparable results. Thus, acid-enzyme hydrolyzed corn syrups having a D.E. value of 63 gave comparable results to a 52 D.E. corn syrup produced by only acid hydrolysis.

The amount of fermentable saccharide required to produce a dry baker's yeast which is initially as active as the fresh wet yeast from which it was prepared is dependent upon a number of factors including the strain of yeast, the propagation conditions before drying, the rate of drying, and the specific sugar used. At a specified drying rate, using sucrose, for example, best results were obtained with the well nurtured, highly active, commercial baker's yeast strain, Bios No. 236, at a level of about 200% sucrose based on yeast solids. With the same yeast strain which had been conditioned to reduce its nitrogen (protein) and phosphorus contents, best results were obtained with about 90 to 120% sucrose. With yeast of the Gebrüder Mayer strain (Bios No. 23) which had been conditioned to reduce its protein and phosphorus contents, best results were obtained with sucrose at a level of about 60%. Using 52 D.E. acid hydrolyzed corn syrup with the well nurtured, highly active, commerical baker's yeast strain, Bios No. 236, a level of about 200% of syrup, based upon yeast solids, provided the best results.

Equally satisfactory results are obtained whether the sugar is added to the suspending liquid, to the yeast, or to the mixture of the two. To obtain the full benefits of the fermentable sugars, my experiments indicate that they should be present throughout the initial phase of dehydration of the yeast, i.e., throughout the period the yeast cells are losing water but still contain enough water to ferment the sugar. Thus, maximum benefit is obtained when at least 80% of the sugar, and preferably all of it, is present when the yeast contains all of the original intracellular water, i.e., while the moisture content of the yeast water slurry is at least about 80%. The addition of a fermentable sugar after the yeast contains only about 50% or less water effects little or no advantage over drying without sugar in my process.

Important benefits are obtained from a fermentable sugar in my process if the water content of the yeast is that of compressed yeast, i.e., about 65%. Still greater benefits are obtained with cream yeasts containing about 78 to 90% water.

When a fermentable sugar and free oxygen are present during the drying of the yeast, an exothermic reaction takes place which supplies some of the heat necessary for the drying.

When drying the yeast in accordance with the process of the invention in the presence of a fermentable sugar, it has been found to be advantageous to control the rate of drying during the initial phase, i.e., while reducing the moisture content of the product to about 20% calculated on an oil-free basis. Moisture in excess of about 60 to 65% by weight of the oil-free product should be evaporated in a period of about 1 hour. Further reduction of the moisture content from between about 60 and 65% to about 20% is desirably completed in not less than in about an additional 1½ hours. The rate at which the remainder of the moisture is removed does not appear to have a great influence upon the leavening activity of the final product. Periods of from about ½ to 3½ hours have produced satisfactory results in reducing the moisture content of the product to as low as 5% or even 1%, calculated on an oil-free basis.

Although the drying process of the invention employing a fermentable sugar during drying may be used to dry baker's yeast of different strains, including yeast which has been conditioned to restrict the protein and phosphorus contents, it is most advantageous when employed to dry the highly active Bios No. 236 strains of baker's yeast which have not been conditioned to restrict their protein and phosphorus contents.

The active dry yeasts produced in accordance with the process of the invention have additional readily distinguishable characteristics which are believed to be unique. These distinctive characteristics will be described in part by reference to the appended drawings which compare active dry yeast produced by the prior art spaghetti process with a free-flowing, solvent-extracted, active dry yeast product of the invention produced in accordance with Example 9 described hereinbelow, which employs corn syrup in the drying process. As shown in Fig. 1 (righthand field) yeast dried and extracted by the process of the invention is a fine free-flowing powder. It is of such fineness as produced that no grinding is required and usually more than 90% by weight passes through a No. 20 U.S. standard sieve (U.S. Bureau of Standards designation) (having openings of about 840 microns), more than 75% by weight passes through a No. 40 U.S. standard sieve (having openings of about 420 microns), and more than 50% by weight passes through a No. 80 U.S. standard sieve (having openings of about 177 microns). This is in contrast with the spaghetti process yeast which consists as produced of such large particles that grinding is necessary for use in baking. Typical commercial ground spaghetti process yeast as shown in Fig. 1 (lefthand field) is still of such coarseness that not more than about 80% by weight will pass through a No. 20 U.S. standard sieve, not more than about 30% by weight will pass through a No. 40 U.S. standard sieve, and not more than about 10% by weight will pass through a No. 80 U.S. standard sieve. Much finer grinding is not commercially feasible without significant injury to the yeast.

Figure 2:
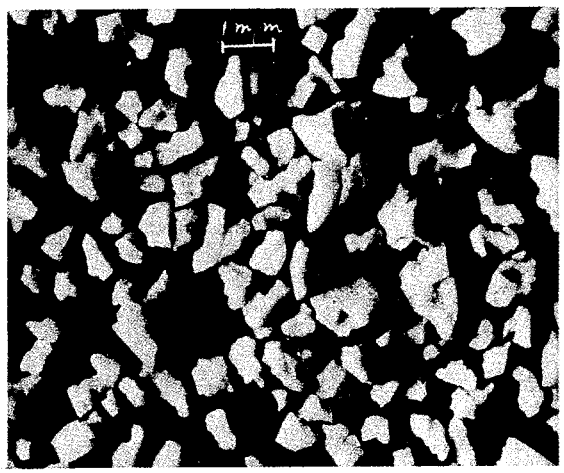
Fig. 2 is a photomicrograph showing conventional commercial active dry yeast produced by the sphagetti process magnified about 10 diameters.
Figure 3:
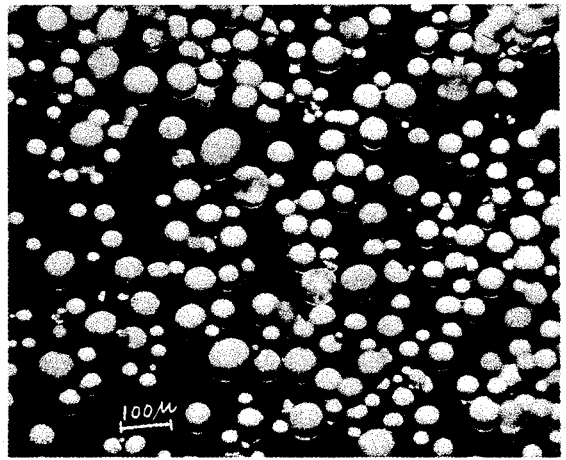
Fig. 3 is a photomicrograph of the active dry baker's yeast produced in accordance with the process described in Example 9 hereinbelow which has been magnified about 100 diameters.

The physical differences between the active dry yeast product of the invention and that of the spaghetti process are further illustrated by reference to Figs. 2, 3, 4, and 5 of the drawings. As shown in Fig. 2, when ground dry yeast of the spaghetti process is magnified 10 diameters, the particles are irregularly shaped rough granules, whereas the product of the invention when magnified 100 diameters, as in Fig. 3, consists of smooth oval and spherical particles. Over 75% by weight of the particles of the dry yeast product of this invention usually vary from about 10 to 200 microns in diameter without grinding, whereas over 75% by weight of the ground spaghetti process dry yeast product varies in particle size from 400 to 1500 microns in diameter.

Figure 4:
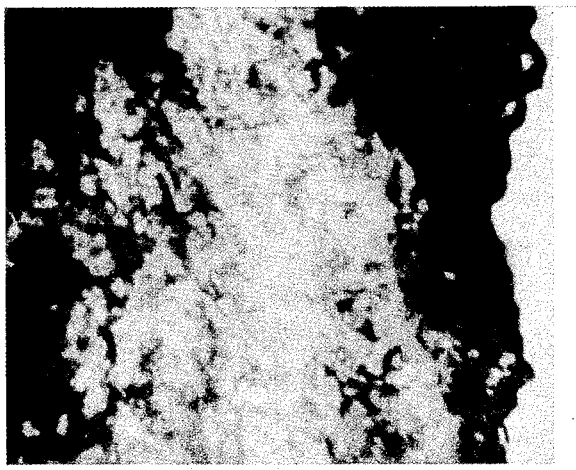
Fig. 4 is a photomicrograph of the surface of the conventional commercial active dry yeast produced by the spaghetti process which has been magnified about 1600 diameters.
Figure 5:
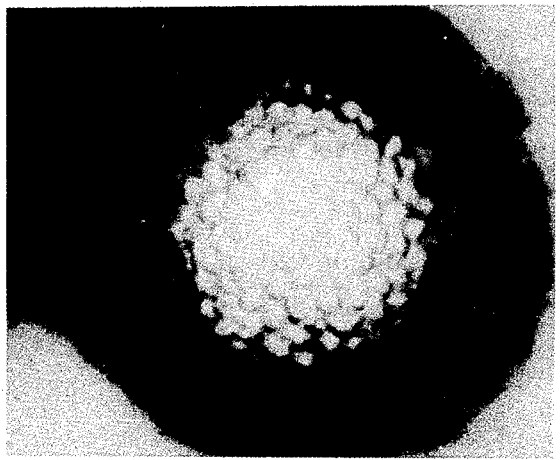
Fig. 5 is a photomicrograph of the surface of the active dry yeast produced according to the process described in Example 9 hereinbelow which has been magnified about 1600 diameters.

Under high magnification (1600 diameters) the surface of the dry yeast product of the invention is markedly different from that of the product of the prior art spaghetti process. As shown in Fig. 5, the surface of the particles of the product of the present invention consists of uniformly packed individual yeast cells which appear to be substantially uniform in size and polyhedral in shape, a structure which is apparently relatively strain-free for individual cells packed together in a sphere. The cellular arrangement and packing of the individual yeast cells appears similar to an aggregation of small balloons packed within a sphere. As shown in Fig. 4, few individual cells are discernible on the surface of the ground product of the spaghetti process which suggests the absence of any regular arrangement of the individual cells in the product.

The active dry yeast product of the invention is also unique in that the aggregated cells in the particles of the product disintegrate and disperse rapidly when immersed in water, usually in less than a minute—far more quickly than the ground spaghetti process yeast or any other prior art active dry yeast of which I am aware.

As has been pointed out hereinabove, the process of the present invention provides a means of overcoming the disadvanges of the prior art yeast drying methods. For the first time, the present invention in its preferred form as practiced with the aid of a fermentable sugar, makes it possible to produce dry active baker's yeast product from the highly active, well-nurtured, strains of yeast (Bios No. 236) ordinarily used to produce compressed yeast whereby the dry product possesses all of the desirable features of the fresh yeast plus stability for prolonged periods of storage at room temperature. The products of the invention may be introduced directly into doughs as a dry ingredient without the prior rehydration step which is essential before leavening with the prior art dry yeasts. In fact, the preferred yeast products of the invention exhibit the same leavening action when incorporated into a dough whether or not subjected to prior rehydration. When dried without the aid of a fermentable sugar, the dry yeast products of the invention will leaven dough effectively without prior rehydration or grinding if incorporated into the dough after the mixing of the other dough ingredients has started and before completion of the mixing. Spaghetti process dry yeast requires both grinding and prior rehydration. Due to the finely-divided state and structure of the dry yeast of the present invention, it is easily dispersed even though unground into dough without the formation of lumps.

Another advantage of the preferred products of this invention is that the baked goods produced from them are of such high quality that they are indistinguishable from similar baked products prepared from fresh compressed yeast of the same strain. This is contrasted with the prior art dry yeast products which cause proteolytic effects that adversely affect the quality of baked goods produced from them.

One of the most important advantages of the products which may be produced by the present invention is that their dough raising activity is markedly superior to that of prior art dry yeast products. Additionally, the preferred product in accordance with the present invention retains high leavening activity when stored for prolonged periods at room temperature.

A further advantage of the process of the present invention, employing the prescribed amounts of a fermentable sugar, is that the yeast may be dried to a product having extremely low moisture values, such as 1% or 2% on an oil-free basis, under rapid drying conditions without destroying or materially reducing its leavening activity. This is a great advantage over the drying practices of the prior art which generally do not permit drying rapidly to below about 8% moisture without substantial losses in leavening activity.

Still another advantage of the active dry baker's yeasts of this invention is that they are characterized by markedly greater resistance to conditions which are normally deleterious to prior art dry yeast, for instance, exposure to elevated temperatures, toxic vapors and cold water.

In order more clearly to disclose the nature of the present invention, specific examples will hereinafter be described. It should be understood, however, that this is done solely by way of example and is intended neither to delineate the scope of the invention nor limit the ambit of the appended claims. In the examples and throughout this specification percentages are intended to refer to percent by weight, unless otherwise specified.

*Example 1*

This example illustrates the result of drying the ordinary kind of yeast used for conventional drying in compressed form by simply suspending it in an edible oil and drying it with air blown through the suspension without any further additions.

Yeast of the Gebrüder-Mayer strain (Bias No. 23) was propagated under restricted nitrogen and phosphorus nutriments in accordance with the standard practice in the art to condition the yeast for subsequent drying. The thus conditioned yeast was separated from the wort by centrifuging and compressed in the conventional manner. The compressed yeast contained 38.41% by weight of solids and 40.84% protein on a solids basis, based on nitrogen analysis. This fresh compressed conditioned yeast (40 grams) was dispersed in 200 grams of corn oil in a high speed agitator known a Waring Blendor. The suspension of yeast in oil was then placed in a glass vessel, the bottom of which consisted of a porous glass plate, through which dry air was passed at the rate of 0.75 cubic foot per minute. The temperature of the air entering the yeast-oil mixture was adjusted to 100° F. After 240 minutes the air flow was stopped and by the application of suction to the bottom of the vessel, oil was removed leaving a friable mass of oil coated yeast particles. The separated yeast product was found upon analysis to contain approximately 55% by weight of oil. The yeast itself contained 7.8% moisture.

As a measure of the baking activity of the yeast product produced in accordance with this example, fermentation tests were made on a sample of the fresh compressed yeast used as starting material and a sample of the dry yeast product produced therefrom in accordance with this example. The samples employed contained substantially equal amounts of yeast solids. Army Quartermaster Corps formula, C.Q.D. 47A, dated November 28, 1944, was used for making the comparative fermentation tests. The amounts called for by this Army formula were all reduced by 10% so that the dough contained 300 grams of flour, 192 milliliters of water, 16.8 grams of sugar, 6 grams of salt, 6 grams of nonfat milk solids, 9 grams of shortening, and an amount of yeast containing 2.8 grams of yeast solids. The dry yeast product was dispersed in a portion of the water containing some of the sugar at 86° F. and allowed to stand for 45 minutes as called for by the Army formula. Following this, all of the ingredients were mixed to form a dough which was placed in a glass jar at 86° F. and allowed to rise. The time required for the dough to reach a volume of 1180 milliliters was recorded as the fermentation time. In this test the original fresh compressed yeast from which the dry yeast product was prepared (approximately 2.8 grams of yeast solids suspended in water containing no sugar and used directly) was subjected to the same test and showed a fermentation time of 104 minutes, with second and third rises of 58 and 61 minutes, respectively, whereas the sample of active dry yeast product showed a fermentation time of 99 minutes, with second and third rises of 61 and 66 minutes, respectively.

This example illustrates the fact that an active dry yeast product having good leavening activity can be produced in a convenient way and in an advantageous form merely by suspending the usual yeast starting material (wet compressed yeast) in an edible oil and blowing air through the suspension.

Example 2

Yeast of the Gebrüder-Mayer strain (Bios No. 23) was propagated under restricted nitrogen and phosphorus nutriment in accordance with the standard practice in the art to condition the yeast for subsequent drying. The thus conditioned yeast was separated from the wort by centrifuging and compressed. The compressed conditioned yeast was found to contain 41.7% protein, based on nitrogen analysis (on a solids basis), and 2.27% phosphorus, calculated as phosphorus pentoxide, also on a solids basis, and 34.0% total solids. 200 grams of the conditioned compressed yeast were dispersed in 800 grams of corn oil by means of a Waring Blendor. The suspension was placed in a glass vessel having a porous glass plate for a bottom, and dry air was passed through it at a rate of about 0.86 cubic foot per minute for almost four hours and at a rate of about 1.1 cubic feet per minute for an additional three hours. The temperature of the yeast-oil slurry was maintained at approximately 90° F. The yeast product was then separated from the bulk of the oil by the application of suction to the porous bottom of the vessel, and the dry yeast product was collected. Upon analysis, the recovered yeast product was found to contain 54.5% oil and the yeast itself contained 8.5% moisture.

In this example the activity of the active dry yeast product was evaluated by a combined fermentation and baking test, and additionally the yeast product was tested as freshly prepared and after storage for 18 days at a temperature of 100° F. In this test a dough was made from a prepared mix containing flour, shortening, sugar, salt and dry skim milk. 550 grams of the dough was allowed to rise at a temperature of 86° F. to a volume of 1180 milliliters. The time required was recorded as the fermentation time. A portion of the dough (340 grams) was then scaled into a baking pan and allowed to ferment at a temperature of 105° F. until it reached the top of the pan. This time was recorded as the proof time. The dough was then baked at 420° F. for 30 minutes. The finished loaf was then cooled and scored for volume and texture. The volume was determined by a seed displacement method. In each test equal amounts of dry yeast solids were employed. The results of the tests were as follows:

|  | Fermentation Time (min.) | Proof Time (min.) | Loaf Volume (cc.) | Bread Texture |
|---|---|---|---|---|
| Dry yeast freshly prepared in accordance with this example | 75 | 50 | 1,570 | Good. |
| The same dry yeast after 18 days at 100° F | 79 | 51 | 1,530 | Satisfactory. |

The ability to retain leavening activity after the accelerated storage test is an index of the quality of the active dry yeast product. As shown by the above results, the leavening activity of this dry yeast product was not substantially impaired during storage for 18 days at 100° F.

Example 3

Yeast of the Gebrüder-Mayer strain (Bios No. 23) was propagated to condition it for drying in accordance with the standard practice in the art by restricting its nitrogen and phosphorus nutriment during propagation and then separated from the wort by means of a centrifuge. 350 milliliters of the centrifuged yeast (cream yeast) thus obtained, containing 80.7 grams of yeast solids, were dispersed in 5 liters of corn oil. Air at a temperature of 77° F., having a relative humidity of 20%, was passed through the dispersion at the rate of 300 cubic feet per hour for 6 hours, the yeast-oil dispersion being maintained at a temperature of approximately 86° F. The yeast was then separated from the bulk of the oil. The dry yeast product thus obtained contained about 18% oil. The moisture content of the yeast product was 5.6%, calculated on an oil-free basis. This yeast product was comparable in quality to the dry yeast product obtained in each of the foregoing examples. Comparative punch tests were conducted on regular commercial dry yeast produced according to the spaghetti process made from another batch of fresh wet yeast of the same type and the dry yeast product produced in accordance with this example. Listed below are the results obtained:

| Type Dough | Dry Yeast | Times (minutes) Spaghetti Process Yeast | Times (minutes) Product of Example 3 |
|---|---|---|---|
| High Sugar | fresh | 97—51—45 | 108—55—46 |
| Do | storage | (not run) | 123—69—61 |
| Sponge | fresh | 118—61 | 112—62 |
| Do | storage | 153—75 | 126—59 |

The storage times in each instance were 96 hours at 115° F. These conditions for making an accelerated storage test have been adopted, for example, in Federal Specification Yeast EE-Y-00131a, dated November 24, 1954.

This example illlustrates the drying of cream yeast as the starting material, thereby avoiding the compressing step used in the spaghetti process. It also illustrates that the yeast may be dried rather quickly to a low moisture content to produce a dry yeast product having good leavening activity and good storage stability, by merely suspending the cream yeast in an edible oil and drying it with air blown through the suspension without any further additions.

The following examples (except Example 14) illustrate the use of my process for successfully drying unconditioned baker's yeast of the Bios No. 236 strain which for some time has been and is now generally employed by bakers in the United States but only in the wet compressed form. My process provides for the first time a dry yeast product good enough to replace compressed baker's yeast of Bios No. 236 strain on an equal yeast solids basis in all applications of compressed yeast. As hereinabove described, by previously known drying processes the Bios No. 236 strain could not be successfully dried for bakers' purposes without conditioning it before drying by reducing its nitrogen and phosphorus content.

*Example 4*

A baker's yeast strain (Bios No. 236), commonly produced in the United States for use by commercial bakers, was grown in the manner customary for such yeast, i.e., without restricting its nitrogen or phosphorus nutriment, and harvested in the usual way, i.e., the yeast was separated from the wort in a centrifuge, washed with water in the centrifuge, and then centrifuged again to give a cream yeast having 16% yeast solids. These yeast solids were found to assay about 50% protein (nitrogen content×6.25) and about 2.8% phosphorus calculated as phosphorus pentoxide. 3.5 gallons of this cream yeast containing 5 pounds of yeast solids were mixed with 10 pounds of commercial 43° Baumé 52 D.E. corn syrup. The mixture was added immediately, before a significant amount of fermentation took place, to 40 gallons of refined corn oil contained in a jacketed, open-top, glass-lined tank approximately 26 inches in diameter and 34 inches high equipped with a sparger at the bottom to insure uniform distribution of air throughout the suspension. The temperature of the suspension was maintained at about 95° F. by circulating it through an external stainless-steel plate and frame type heat exchanger while air at a temperature of about 77° F. containing about 20 grains of water per pound was passed through the sparger at a rate of 120 cubic feet per minute for 2½ hours, until the moisture content of the suspended material was reduced to about 20%, and then the rate of air introduction was reduced to 25 cubic feet per minute for an additional 2½ hours, until the moisture content was reduced to about 5%. The resulting yeast product was then separated from the oil in a centrifuge. The centrifuged product contained about 42% yeast solids, 5% moisture, 7% corn oil and 46% residual corn syrup solids. This product was further reduced in oil content by extracting it three times with methylene chloride using an amount of fresh methylene chloride equal to the weight of the product for each extraction. The resulting product was a fine, free-flowing powder containing 44.9% yeast solids, 5.0% moisture, 0.1% oil and 50.0% residual corn syrup solids. The composite of a number of products made by the process of this example was evaluated by commercial methods in a bakery pilot plant in the production of a variety of baked goods including:

(1) White breads by the sponge-dough, short time straight dough, and brew processes;

(2) Sour rye breads by the straight and short time straight dough processes and American rye breads by the sponge-dough and short time straight dough processes;

(3) Whole-wheat breads by the sponge-dough and short time straight dough processes;

(4) Kaiser rolls by the straight dough and short time straight dough processes;

(5) Cinnamon rolls by the sponge-dough, straight dough, and short time straight dough processes;

(6) Danish pastry by the one-day retarded dough process (refrigerated 40° F.) and the four-day retarded frozen (minus 20° F.) dough process; and (7) Yeast leavened doughnuts.

In each case the active dry yeast product produced in accordance with the process of this example was employed to replace fresh compressed baker's yeast of the same strain (containing 30% yeast solids) at a 67% level, resulting in an identical amount of yeast solids as when the fresh compressed yeast was used. The baked products were compared in each case with the controls prepared with fresh compressed yeast and were scored as essentially equal in quality.

The following extraction tests were made on products prepared by repeating Example 4 and on standard commercial yeast products. A portion of each respective product was first analyzed for total nitrogen content. Another portion of each product was extracted twice with water at 110° F. In the first of these extractions, 25 grams of each sample was allowed to take up as much water as it would retain on centrifuging and the total amount of extracting water was adjusted so that 150 ml. liquid was recovered by centrifuging and decanting the sample. Each sample was then extracted once more with 100 ml. of water at 110° F. and all of the decantates were combined and filtered. The clear filtrate was then analyzed for amino nitrogen by the standard Sorensen titration method. The amino nitrogen results, expressed as percentage of total nitrogen found in the unextracted product, are given in the following table:

| Product | Number of Samples | Average Result, Percent |
| --- | --- | --- |
| Commercial compressed yeast | 8 | 0.43 |
| Products made by the method of Example 4 | 3 | 0.62 |
| Commercial spaghetti active dry yeast | 10 | 1.80 |
| Commercial inactive dry yeast | 4 | 4.30 |

These results show that the product of Example 4 had an extractable amino nitrogen content less than 1% of the total nitrogen found in the unextracted product and very close to that of commercial compressed yeast; whereas on the same basis the commercial active dried yeast samples had extractable nitrogen well above 1% with 10 samples ranging from 1.35 to 2.42%, and the inactive commercial dried yeast had extractable nitrogen ranging from 3.54 to 5.4% with an average value of 4.3%.

These extraction tests show that the product of this example is very similar to well-washed compressed yeast in the fact that it does not lose more than small amounts of amino nitrogen on extraction with water at 110° F. This is an indication that in the product of Example 4, as in commercial compressed yeast, there has been very little or no damage to the yeast cells.

*Example 5*

A dry baker's yeast (Bios No. 236) product was prepared in accordance with Example 4, except that 7.5 pounds of corn syrup were employed instead of 10 pounds. The product that was separated from the oil by centrifuging contained 49% yeast solids, 5% moisture, 6% oil and 40% residual corn syrup solids. This product was evaluated in dough tests, known to those versed in the art as punch tests, in sponge-dough bread type and in sweet goods (high sugar) type formulations, and was found to be functionally equivalent, on a yeast solids basis, to fresh compressed yeast of the same strain. These tests were carried out by mixing doughs according to specified formulations and noting the number of minutes required to raise the dough. In the sponge-dough test, a "sponge" made from a portion of the ingredients and containing 180 grams of flour was transferred to a cylindrical jar of specified dimensions and allowed to rise to a volume of 750 ml. The time was noted, the dough was punched down and flattened and allowed to rise to this volume a second time. This time was noted and the sponge was then allowed to rest for a total period (including the two rises) of 3½ hours. The balance of the ingredients, including 120 grams of flour was then mixed in and the dough was allowed to rise to a volume of 1180 ml. This time was noted, the dough was punched down and flattened, and allowed to rise a second time. In the sweet goods (high sugar) test, all of the ingredients, including 300 grams of flour, were mixed in at the start, the dough was transferred to the test jar and the time was noted for the dough to rise to a volume of 1180 ml. The dough was then punched and flattened and allowed to rise a second time. This time was noted and the test was repeated for a third rise.

Data obtained in these above described tests are given below. Larger numbers indicate poorer yeast leavening activity and vice versa. It will be noted that on an equal yeast solids basis, the dry baker's yeast product prepared according to this example was essentially as active as fresh compressed yeast of the same strain. The conventional active dry yeast of commerce produced by the spaghetti process when tested under these conditions would have to be used at a level representing approximately 50% more yeast solids in order to match these activities. In terms of minutes for each rise, the results obtained are recorded in the table below.

|  | Formulation | | |
|---|---|---|---|
|  | Sponge-Dough | | High Sugar |
|  | Sponge Portion | Dough Portion |  |
| Fresh compressed baker's yeast | 81—47 | 67—50 | 105—50—42 |
| The dry baker's yeast product of this example | 84—51 | 69—53 | 95—49—42 |

It is noteworthy that (as illustrated by this example and Examples 6 through 8 which follow in which the results of sweet goods (high sugar) dough tests are given) the dried yeast product of the example was in each case actually more active in the first dough rise than like yeast in the wet compressed form. This high degree of initial activity is characteristic of dried yeast products made in accordance with my invention using 150% or more by weight (based on yeast solids) of corn syrup of suitable D.E. value (or equivalent carbohydrate) together with the wet yeast during the drying in oil suspension.

Example 6

A dry baker's yeast (Bios No. 236) product was prepared in accordance with Example 5, except that the temperature of the suspension was gradually raised beginning with the fourth hour, by introducing heat via the air and the tank jacket as well as the heat exchanger from the existing temperature of 95° F. to a final value of 158° F. In this case the air containing 20 grains of water per pound was passed through the sparger for 3¼ hours at a rate of 120 cubic feet per minute until the moisture content of the yeast product was reduced to about 10% and then the rate of introduction of the air was reduced to 25 cubic feet per minute for an additional 2½ hours until the moisture content of the product was reduced to 1.5%. The resulting dry baker's yeast product was then separated from the oil in a centrifuge and found to assay 51.5% yeast solids, 1.5% moisture, 8.7% corn oil and 38.3% residual corn syrup solids. This product was evaluated by the dough tests described in Example 5 and was found to leaven the sweet goods (high sugar) doughs essentially as rapidly as fresh compressed baker's yeast of the same strain, but to require 15 to 20% more time in the sponge-dough formulation.

The comparative results are shown by the following table with the rise times in minutes:

|  | Formulation | | |
|---|---|---|---|
|  | Sponge-Dough | | High Sugar |
|  | Sponge Portion | Dough Portion |  |
| Fresh compressed baker's yeast | 81—47 | 67—50 | 105—50—42 |
| The dry baker's yeast product of this example | 99—59 | 77—58 | 92—52—44 |

This example shows that by using my process it is possible to dry a yeast of even the Bios No. 236 strain to a product having a moisture content of as low as 1.5% with little loss of its leavening activity in sponge dough tests and essentially without loss in sweet goods (high sugar) dough tests.

Example 7

A dry baker's yeast (Bios No. 236) product was prepared in accordance with Example 5 but the heat required for dehydration was supplied by heating the air introduced into the yeast suspension in oil to temperatures as high as 185° F., instead of by circulating the suspension through an external heat exchanger. The product was evaluated by the dough tests described in Example 5 and was found to leaven sweet goods (high sugar) doughs as rapidly as fresh compressed baker's yeast of the same strain (87–49–40 vs. 105–50–42 minutes) and to require not more than 10% additional time in the sponge-dough test (88–53//69–56 vs. 81–47//67–50 minutes.

Example 8

A dry baker's yeast (Bios No. 236) product was prepared in accordance with Example 5, except that the rate of drying was increased by maintaining the air feed rate at the original value of 120 cu. ft./min. throughout (instead of reducing it to 25 cu. ft./min. at the end of 2½ hours) and by decreasing the yeast loading to approximately 40 per cent of the loading used in Example 5 (1.5 gallons of cream yeast containing 2.14 pounds of yeast solids instead of 3.5 gallons containing 5.0 pounds of yeast solids). The amount of corn syrup employed was reduced from 7.5 pounds to 3.54 pounds. The yeast product was separated from the oil at the end of 5 hours and found to assay 41.5% yeast solids, 3.6% moisture, 8.5% corn oil and 46.4% residual corn syrup solids. The product was evaluated by the dough tests described in Example 5 and was found to leaven sweet (high sugar) goods and sponge-dough formulations essentially as rapidly as fresh compressed baker's yeast of the same strain (high sugar dough, 76–52–46 vs. 105–50–42 minutes for the fresh compressed yeast; sponge-dough, 85–51//65–49 vs. 81–47//67–50 minutes for the fresh compressed yeast).

Example 9

A dry baker's yeast (Bios No. 236) product was prepared in accordance with Example 5, but after separation from the oil in a centrifuge it was extracted to remove oil by passing an equal weight of methylene chloride once through the product in the centrifuge. The resulting product was a fine free-flowing powder containing 53.5% yeast solids, 5.4% moisture, 1.8% oil and 39.3% residual corn syrup solids. The powder consisted of very fine particles of substantially uniform size and spherical shape as shown in Fig. 1 (left hand field), Fig. 3 and Fig. 5 of the drawings. This yeast was evaluated by commercial methods in a bakery pilot plant in white bread bakes by the sponge-dough process and in cinnamon roll bakes by the straight dough process. The product was used at a 55% by weight replacement for fresh compressed pound yeast of the same strain thus providing an equal amount of yeast solids as in fresh compressed pound yeast. The performance of the active dry yeast and the quality of the baked goods were scored identical with the fresh compressed yeast of the same strain.

*Example 10*

A dry baker's yeast (Bios No. 236) product was prepared in accordance with Example 5, but the amount of 43° Baumé 52 D.E. corn syrup added was reduced by 50%, i.e., 3.75 pounds of corn syrup (instead of 7.5 pounds) were added to 3.8 gallons of cream yeast containing 5.0 pounds of yeast solids. The product was separated from the oil in a centrifuge and was found to contain 64% yeast solids, 5% moisture, 8% oil and 23% residual corn syrup solids. The product was evaluated by the dough tests described in Example 5 and was found to require approximately 9% more time in the sponge-dough test (93–51//71–51 vs. 81–47//67–50 minutes) and approximately 26% more time in the sweet goods (high sugar) test (130–65-53 vs. 105–50–42 minutes) than fresh compresesd baker's yeast of the same strain.

The storage stability of the product of this example, made with a smaller amount of corn syrup addition, was not as good as that obtained with the product of Example 5 made with twice as much corn syrup but the leavening activity of the stored product was still greatly superior in the sponge-dough test and substantially similar in the sweet goods (high sugar) dough test to that of the conventional active dry yeast of commerce produced by the spaghetti process, even when the dried spaghetti process yeast product was used on a basis of 23% more yeast solids. This is shown in the dough test data described below, employing the testing procedures described in Example 5, obtained with products stored under standard accelerated storage test conditions, namely, storing the dry yeast in airpack, pressure-capped bottles for 96 hours at 115° F. The products of Examples 5 and 10 were tested using the products at a level representing the same amount of yeast solids as when the fresh compressed yeast is used in baking. With the conventional active dry yeast of commerce produced by the spaghetti process, 23% more yeast solids are used routinely in this testing procedure because of the known lesser activity of this product and this routine practice was used in the following test. These test data obtained are:

|  | Dough Test, Minutes | |  |
| --- | --- | --- | --- |
|  | Sweet Goods (High Sugar) Formulation | Sponge-Dough Formulation |  |
| Yeast Product (Bios No. 236) made by the process of Example 5 employing 150% of corn syrup based on yeast solids | 107–54–50 | 108–58 | 81–61 |
| Yeast product (Bios No. 236) made by the process of Example 10 employing 75% of corn syrup based on yeast solids | 150–81–65 | 114–59 | 82–66 |
| Conventional active dry yeast of commerce (Bios No. 23) produced by the spaghetti process, tested at a 23% more yeast solids level than the above yeast products | 131–76–68 | 130–71 | 92–71 |

Even with 23% more yeast solids favoring the product of the conventional spaghetti process, the product of Example 5 gave much better results on storage in both tests and the product of Example 10 gave as good or better results than the product of the conventional spaghetti process, ending up with 65 as compared to 68 on the final rise in the sweet goods test and 66 as compared to 71 on the final rise in the sponge dough test.

*Example 11*

A dry baker's yeast (Bios No. 236) product was prepared in accordance with Example 8, but the carbohydrate used was sucrose instead of corn syrup. 1.7 pounds of sucrose were added to 1.5 gallons of the cream yeast containing 2.14 pounds of yeast solids. Additionally, 7.5 pounds of water were added to the suspension in oil during the first 45 minutes of drying (2.5 pounds each at 15, 30 and 45 minutes) to regulate the rate of drying. The resulting yeast product was separated from the oil at the end of 5 hours by centrifuging and found to assay 73% yeast solids, 4% moisture, 9% corn oil and 14% residual carbohydrate solids. The product was evaluated by the dough tests described in Example 5 and was found functionally equal to fresh compressed yeast of the same strain, not more than 5% extra time being required to leaven the doughs. The storage stability of these products, however, was extremely poor (useful life of about 2 weeks at room temperature) unless the products were refrigerated. In terms of the accelerated storage conditions defined in Example 10, after 96 hours storage 115° F. 90% more time was required to leaven high sugar doughs and 20% more time to leaven sponge-doughs than was required for the product of Example 5 made with 150% corn syrup and stored under similar conditions.

*Example 12*

A dry baker's year (Bios No. 236) product was prepared in accordance with Example 5, except that maltose was used as the carbohydrate and the scale of operation was much smaller. Thus, 375 grams of yeast cream containing 62 grams of yeast solids were dispersed in 5 liters of corn oil along with 98 grams of maltose hydrate in a stainless steel tank having the dimensions of 8 inches diameter and 18 inches tall equipped with a stainless steel sparger and a mechanical stirrer. The tank was immersed in a water bath which was capable of continual temperature adjustment so that the temperature of the slurry being dried was maintained at 95° F. for 4 hours and then at 104° F. for the fifth hour. Air containing 20 grains of water per pound and at a temperature of 77° F. was passed through the slurry at a rate of 5 cubic feet per minute for the entire period of 5 hours. The product was then separated from the oil in a centrifuge and found to assay 40.6% yeast solids, 4.0% moisture, 10.8% corn oil and 44.6% residual carbohydrate solids. The product was evaluated by the dough tests described in Example 5 and was found functionally equal to fresh compressed yeast of the same strain in high sugar dough test performance, but to require 13% more time in sponge-dough test performance. The storage stability of this product, in terms of the accelerated storage conditions defined in Example 10, after 96 hours at 115° F., was found identical with that of the product of Example 5 made with 150% of corn syrup per weight of starting yeast solids.

*Example 13*

A dry baker's yeast (Bios No. 236) product was prepared in accordance with Example 7, except that the process was scaled up to dry eighteen times (i.e., 90 pounds) as much yeast solids in one batch. 50 gallons of cream yeast containing 21% yeast solids, i.e., 90 pounds of yeast solids, were dispersed in 158 gallons of corn oil along with 135 pounds of 43° Baumé 52 D.E. corn syrup in a stainless steel tank having the dimensions of 3 feet in diameter and 20 feet tall and equipped with a stainless steel sparger capable of passing the required amount of air. Heated air, containing about 23 grains of water per pound of air, was passed through the slurry at a rate of 99 pounds of air per minute for a period of 3 hours and then at a rate of 24.5 pounds of air per minute for an additional 2 hours. During the first three hours the temperature of the slurry was kept at about 90° F. by adjusting the temperature of the air blown through it. During the last two hours the temperature was gradually increased to about 109° F. by adjusting the temperature of the air blown through it. The product was recovered by centrifugation and assayed 51% yeast solids, 4% moisture, 6% corn oil and 39% residual corn syrup solids. A portion of this product was reduced further in oil content by extraction with methylene chloride. The resulting extracted dry product was a fine, free-flowing powder containing 53.5% yeast solids, 4.7% moisture, 0.1% corn oil and 41.7% residual corn syrup solids.

The particle size distribution was determined on the extracted product of this example by placing 1000 grams of the product in a U.S. standard sieve, Bureau of Standards designation No. 80 (having openings of about 177 microns) which was nested over a No. 140 U.S. standard sieve (having openings of about 105 microns) which was in turn nested over a No. 230 U.S. standard sieve (having openings of about 62 microns), and the nested screens shaken on a Ro-Tap nesting sieve shaker No. 6269, manufactured by the W. S. Tyler Co., Cleveland, Ohio, for 45 minutes until substantially no more particles passed through any of the three screens. The test showed that about 20% by weight of the product did not pass through the No. 80 sieve, 74% passed through the No. 80 sieve but not the No. 140 sieve, 5.2% passed through the No. 140 sieve but not the No. 230 sieve, and 0.9% passed through the No. 230 sieve. By way of comparison, a typical ground active dry yeast product of the spaghetti process was tested in the same manner using 100 grams of ground spaghetti product using a succession of nested sieves of No. 20 (having 840 micron openings), No. 40 (having 420 micron openings) and No. 60 (having 250 micron openings) designations. After shaking the nested screens on the same testing apparatus for 15 minutes substantially no more ground yeast product passed through any of the screens. Results of the test showed that 39.8% by weight did not pass through the No. 20 sieve, 48.7% passed through the No. 20 sieve but not the No. 40 sieve, 9.7% passed through the No. 40 sieve but not the No. 60 sieve, and 1.8% passed through the No. 60 sieve. Thus the product produced in accordance with the above example without grinding consisted of particles which were much smaller than the particles of spaghetti process yeast as commercially ground. Furthermore, spaghetti process yeast products cannot be ground to the unground fineness of my products without seriously damaging the leavening activity by such grinding.

Both products of this example, extracted and unextracted, were evaluated by commercial methods in a bakery pilot plant in the production of a variety of baked goods. With the unextracted product, white breads were baked by the sponge-dough, straight dough, short time straight dough and brew processes and cinnamon rolls were baked by the straight dough and short time straight dough processes. With the extracted product white bread was baked by the sponge-dough process and cinnamon rolls by the straight-dough process. The unextracted product was used at a 59% replacement level for compressed baker's yeast of the same strain and the extracted product at 56% replacement, resulting in both cases in the same amount of yeast solids as when the fresh compressed baker's yeast was used. The baked goods were compared in each case with controls prepared with fresh compressed yeast of the same strain and were scored as the same. Evaluation of the stability of both the unextracted and extracted active dry yeast products was carried out by allowing the products to remain at room temperature (packed in polyethylene bags) for two months followed by an additional series of bakes. The loss in dough raising activity of the dry product over the storage period was of the order of 10% in the bread formulations and of 25% in the sweet goods formulation, requiring a slightly longer time allowance for the raising of the dough. In each case, however, quality of the baked goods was essentially the same as that of corresponding products baked with fresh compressed yeast.

*Example 14*

This example illustrates the drying of a suspension of yeast in oil by spraying it repeatedly into air instead of blowing air through the suspension as illustrated in the previous examples. A cyclic step of spraying the suspension into air in lieu of blowing air through the suspension, may be used in my process for drying suspensions of baker's yeast of any strain, including the Bios No. 23 or Bios No. 236 strain, and whether or not the yeast is conditioned before drying.

In this particular example, the yeast starting material was baker's yeast of the strain Bios No. 23, which had been conditioned for drying in the manner usually employed in the United States for drying yeast by the conventionl spaghetti process. To 2.25 gallons of such yeast, containing 3.5 pounds of yeast solids and the balance water, were added 1.85 pounds of 43° Baumé 52 D.E. corn syrup, and this mixture was suspended by mechanical agitation in 30 gallons of corn oil. This slurry was pumped into a spray tower 12 feet high and 2½ feet in diameter, and recycled through the spray tower over a period of 3½ hours counter-currently to a stream of air of 20 grains per pound humidity, having an incoming temperature of 150° F. and moving at the rate of 8,700 cubic feet per hour. The yeast product thus produced was separated from the oil by a centrifuge and was found to assay 65% yeast solids, 7% moisture, 8% corn oil, and 20% residual corn syrup solids. The product was evaluated by the dough tests described in Example 5 and found to be substantially as active as the undried yeast used as the starting material.

In this example, the proportion of corn syrup to yeast solids employed was about 50% based on yeast solids. Such proportions of corn syrup to yeast solids are suitable for drying Bios No. 23 yeast as it is conventionally conditioned for drying by the spaghetti process. However, if fully nurtured Bios No. 236 yeast is to be dried by the spray method of this example, the proportion of corn syrup employed for better results should be larger and advantageously of the same order as used in Example 4.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What is claimed is:

1. In a process of preparing active dry yeast the steps of suspending wet yeast in a finely divided state in a medium not harmful to yeast which is liquid at the drying temperature both in the presence and absence of water and then drying the yeast by evaporating water from the suspension while maintaining the yeast in suspension in said liquid.

2. The process as defined by claim 1 wherein the water is evaporated by bringing the yeast suspension into intimate contact with a gas not harmful to yeast.

3. The process as defined by claim 1 wherein the water is evaporated from the yeast by passing through the yeast suspension a stream of a gas not harmful to yeast.

4. The process as defined by claim 1 wherein the water is evaporated by spraying the yeast suspension repeatedly through a gaseous atmosphere not harmful to yeast.

5. In a process of preparing active dry yeast the steps of suspending yeast in a finely divided state in an edible oil and drying the yeast by evaporating water from the suspension by bringing the suspension into intimate contact with air, while maintaining the yeast in suspension in said oil.

6. The process as defined by claim 5 with the added step of separating at least some of the oil from the yeast after drying.

7. The process as defined by claim 5 wherein the edible oil is a vegetable oil.

8. A process of producing active dry yeast which comprises suspending yeast in a finely divided state in corn oil, evaporating moisture from the suspension with air until the moisture content of the yeast is reduced below about 10%, and then separating the bulk of the oil from the dried yeast.

9. A process of producing active dry yeast which comprises suspending wet yeast and a saccharide which the yeast is capable of fermenting in a finely divided state in a medium not harmful to yeast which is liquid at the drying temperature both in the presence and absence of water and then drying the yeast by evaporating water from said suspension by bringing the suspension into intimate contact with a gas not harmful to yeast, while maintaining the yeast in suspension in said liquid.

10. A process of producing active dry baker's yeast which comprises suspending wet baker's yeast in a finely divided state in an edible oil in the presence of a sugar which the yeast is capable of fermenting, evaporating moisture from the suspension by bringing the suspension into intimate contact with a gas not harmful to yeast which contains free oxygen, and separating the resulting product from at least some of the suspending oil.

11. A process as defined by claim 10 wherein the gas is air.

12. A process as defined by claim 10 wherein the edible oil is a vegetable oil.

13. A process as defined by claim 10 wherein the wet yeast is a cream yeast containing not more than 22% of yeast solids.

14. A process as defined by claim 10 in which the sugar comprises a mixture of yeast fermentable and non-fermentable sugars.

15. A process as defined by claim 14 wherein the sugar is a hydrolyzed starch syrup containing dextrose, maltose, dextrins, and higher sugars, and the amount of fermentable sugar therein is such that at the end of the drying process all of the fermentable sugar except maltose is fermented and some of the maltose is also fermented.

16. A process as defined by claim 14 wherein the sugar is a hydrolyzed starch syrup containing dextrose, maltose, dextrins, and higher sugars.

17. A process as defined by claim 16 wherein the syrup is corn syrup having a D.E. value between about 42 and 65.

18. A process as defined by claim 10 wherein the sugar is present throughout the period the yeast cells are losing water but still contain enough water to ferment the sugar.

19. A process as defined by claim 10 wherein the gas is air, the oil is corn oil, and the sugar is 52 D.E. corn syrup, and the wet yeast is a cream yeast containing not more than about 22% solids and is of yeast of a Bios No. 236 strain.

20. A process of producing an active dry baker's yeast which comprises suspending wet baker's yeast of a Bios No. 236 strain containing on a yeast solids basis at least about 47% protein based on nitrogen analysis and at least about 2.6% phosphorus calculated as $P_2O_5$, in a finely divided state in an edible vegetable oil, in the presence of a sugar which the yeast is capable of fermenting, evaporating moisture by passing air through the suspension until the moisture content of the product has been reduced to at least below 10%, and then separating the product from at least most of the suspending oil.

21. An active dry baker's yeast product, containing less than about 8% of moisture by weight, said product being in the form of unground fine particles of substantially ovular and spherical shapes, most of said particles being less than about 200 microns in diameter, the surface of said particles when viewed under magnification (after extracting any obscuring liquid present in sufficient quantity to obscure visibility of the surface under a microscope) exhibiting a uniform assembly of individual yeast cells, said particles being further characterized by rapidly disintegrating and dispersing in water into individual yeast cells, most of which are viable.

22. A product in accordance with claim 2, which also contains as a constituent extraneous to the yeast a solid fermentation residue of a yeast fermentable saccharide.

23. A product in accordance with claim 22, in which said residue constituent is of a yeast fermented syrup comprising hydrolyzed starch and is present in an amount which is at least 25% of the weight of the product, said residue including dextrin and sugar constituents not fermentable by yeast and being substantially free from yeast fermentable constituents except maltose, said product also contains as a constituent extraneous to the yeast an edible vegetable oil present in an amount from a small fraction of a percent to about 10% by weight of the product.

24. An active dry baker's yeast product of the Bios No. 236 strain, containing by weight less than 8% of moisture, from a small fraction of a percent to about 10% of an edible vegetable oil and at least 25% by weight of a residue of yeast fermented syrup comprising hydrolyzed starch, said residue including dextrin and sugar constituents not fermentable by yeast and being substantially free from yeast fermentable constituents except maltose, said product being in the form of unground fine particles of substantially ovular and spherical shapes, most of said particles being less than 200 microns in diameter, the surface of said particles when viewed under magnification (after extracting the vegetable oil constituent if it be present in sufficient quantity to obscure visibility of said surface under a microscope) exhibiting a uniform assembly of individual yeast cells, said particles being further characterized by rapidly disintegrating in water, said product being further characterized by exhibiting substantially the same leavening activity when incorporated in dough without previous rehydration as when incorporated in dough after previous rehydration, and said product being further characterized by having when fresh substantially the same leavening activity, based on yeast solids content, as fresh wet compressed baker's yeast of the Bios No. 236 strain and by retaining such high leavening activity under like storage conditions many times as long as said compressed yeast.

25. A product in accordance with claim 24 in which the moisture content is less than about 5% by weight.

26. A product in accordance with claim 24 in which the syrup constituent is hydrolyzed corn syrup of about 42 to 65 D.E.

27. A product in accordance with claim 24 in which the corn syrup is hydrolyzed corn syrup of about 52 D.E.

28. A product in accordance with claim 24 in which the oil constituent does not exceed a fraction of a percent and the product consists of free flowing particles.

References Cited in the file of this patent

UNITED STATES PATENTS

| | | |
|---|---|---|
| 1,420,557 | Klein | June 20, 1922 |
| 1,706,564 | Dawson | Mar. 26, 1929 |
| 2,111,201 | Auden et al. | Mar. 15, 1938 |
| 2,136,399 | Schultz | Nov. 15, 1938 |
| 2,523,483 | Stern | Sept. 26, 1950 |

UNITED STATES PATENT OFFICE

CERTIFICATE OF CORRECTION

Patent No. 2,919,194                          December 29, 1959

William R. Johnston

It is hereby certified that error appears in the printed specification of the above numbered patent requiring correction and that the said Letters Patent should read as corrected below.

Column 1, line 57, for "published in" read -- published by --; column 2, line 33, for "storgae" read -- storage --; line 50, for "must" read -- much --; column 7, line 42, for "30%" read -- 20% --; column 12, line 64, for "known a" read -- known as a --; column 18, line 35, after "minutes" insert a closing parenthesis; column 19, line 21, for "compresesd" read -- compressed --; column 21, line 15, for "nesting" read -- testing --; column 24, line 11, for the claim reference numeral "2" read -- 21 --.

Signed and sealed this 20th day of September 1960.

(SEAL)

Attest:
KARL H. AXLINE
Attesting Officer

ROBERT C. WATSON
Commissioner of Patents